(12) United States Patent
Chun et al.

(10) Patent No.: US 8,379,290 B2
(45) Date of Patent: Feb. 19, 2013

(54) ACTIVE MATRIX ELECTROCHROMIC DEVICE ARRAY AND METHOD OF MANUFACTURING THE SAME

(75) Inventors: Young-tea Chun, Suwon-si (KR); Deuk-seok Chung, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 116 days.

(21) Appl. No.: 12/923,876

(22) Filed: Oct. 13, 2010

(65) Prior Publication Data

US 2011/0199666 A1      Aug. 18, 2011

(30) Foreign Application Priority Data

Feb. 12, 2010   (KR) ................. 10-2010-0013510

(51) Int. Cl.
  *G02F 1/153*    (2006.01)
(52) U.S. Cl. ..................... 359/269; 359/265
(58) Field of Classification Search .......... 359/269, 359/265
  See application file for complete search history.

(56) References Cited

U.S. PATENT DOCUMENTS

2010/0182673 A1* 7/2010 Jang et al. .................. 359/270

FOREIGN PATENT DOCUMENTS

| JP | 2005-202245 | 7/2005 |
| JP | 2006-053374 | 2/2006 |
| JP | 2006-085097 | 3/2006 |
| KR | 10-2003-0030605 | 4/2003 |
| KR | 10-2008-0111957 | 12/2008 |

* cited by examiner

*Primary Examiner* — James Jones
(74) *Attorney, Agent, or Firm* — Harness, Dickey & Pierce, P.L.C.

(57) ABSTRACT

An active matrix electrochromic device array and a method of manufacturing the active matrix electrochromic device array may include a first substrate including a pixel electrode corresponding to each of the pixels, and an electrochromic layer; a second substrate including a counter electrode and a reflective layer arranged on the counter electrode, wherein the first substrate and the second substrate are coupled to each other having a distance therebetween by a partition wall supporting the first substrate and the second substrate; and the partition wall isolates a space between the first substrate and the second substrate with respect to each of the pixels, thereby preventing or reducing an electrolyte filled in the space from being diffused toward a neighboring space.

18 Claims, 6 Drawing Sheets

ACTIVE MATRIX ELECTROCHROMIC DEVICE ARRAY AND METHOD OF MANUFACTURING THE SAME

CROSS-REFERENCE TO RELATED APPLICATIONS

This application claims priority under U.S.C. §119 to Korean Patent Application No. 10-2010-0013510, filed on Feb. 12, 2010, in the Korean Intellectual Property Office (KIPO), the entire contents of which is incorporated herein by reference.

BACKGROUND

1. Field

Example embodiments relate to an active matrix electrochromic device array and a method of manufacturing the active matrix electrochromic device array, and more particularly, to an active matrix electrochromic device array and a method of manufacturing the active matrix electrochromic device array in which a partition wall structure for electrolyte separation is arranged.

2. Description of the Related Art

An electrochromic device may be a device of which color changeable material is stimulated by external stimuli, including electricity, to cause chemical or physical changes in molecular structure and induce visual electrochromic effects. The electrochromic device involves using a principle by which ions or electrons included in an electrolyte migrate into an electrochromic layer, and participate in a redox reaction when an electrical potential difference is applied to a transparent electrode and a counter electrode between which the electrochromic layer is filled. Therefore, no visual changes may be caused in color or shade.

As a display device using the electrochromic device, a structure in which the electrochromic device may be aligned in a segment manner and each segment may be driven has been introduced. However, in an electrochromic device array according to the related art, discoloration cannot be performed exactly on a desired pixel due to an image diffusion occurring because an electrolyte between an upper substrate and a lower substrate is connected to all pixels, and thus, the electrochromic device array may only be applicable to a window or a mirror, which changes color entirely.

SUMMARY

Provided are an active matrix electrochromic device array and a method of manufacturing the active matrix electrochromic device array in which a partition wall structure for electrolyte separation is arranged. Additional aspects will be set forth in part in the description which follows and, in part, will be apparent from the description, or may be learned by practice of example embodiments.

According to example embodiments, an active matrix electrochromic device array may include a first substrate including a pixel circuit having a plurality of pixel electrodes, wherein the plurality of pixel electrodes are two-dimensionally arrayed, a thin film transistor (TFT) connected to each of the plurality of pixel electrodes, and a plurality of electrochromic layers on the plurality of pixel electrodes, respectively; a second substrate including a counter electrode and a reflective layer thereon, wherein the second substrate is coupled to the first substrate having a distance therebetween and the reflective layer faces the plurality of electrochromic layers; a partition wall between the first substrate and the second substrate so as to support the first substrate and the second substrate having a distance therebetween, the first and second substrate having isolating spaces therebetween corresponding to the plurality of pixel electrodes; and an electrolyte filled in the spaces isolated by the first substrate, the second substrate, and the partition wall.

The partition wall may further include a supporting partition wall arranged in an upper region of the TFT and may be formed of a photoresist. The partition wall may be a black matrix with respect to or defining pixels, may be non-porous and may have a height of about 50 µm. The partition wall may be formed by extending toward an outer region of an area including the plurality of pixel electrodes.

According to example embodiments, a method of manufacturing an active matrix electrochromic device array may include providing a first substrate including a pixel circuit having a plurality of pixel electrodes that are two-dimensionally arrayed and a thin film transistor (TFT) connected to each of the plurality of pixel electrodes; forming a partition wall in the first substrate, wherein the partition wall isolates a space corresponding to the plurality of pixel electrodes; forming an electrochromic layer in a region of the first substrate, wherein the partition wall is not formed in the region; arranging a second substrate over the first substrate, the second substrate including a counter electrode and a reflective layer on the counter electrode; aligning the first substrate and the second substrate so that the reflective layer faces the electrochromic layer; injecting an electrolyte into the space isolated by the first substrate, the second substrate, and the partition wall; and coupling the first substrate and the second substrate.

Forming the partition wall may include coating a photoresist on the first substrate; removing the photoresist coated on regions corresponding to the plurality of pixel electrodes; and hardening the photoresist remaining on the first substrate. Coating the photoresist may further include removing bubbles of the photoresist before the first substrate is coated. A region where the partition wall is formed may include an upper region of the TFT. The partition wall may be formed to have a height of at least 50 µm. The partition wall may be formed by extending toward an outer region of an area where the plurality of pixel electrodes are arranged. A region where the partition wall is formed may include an upper region of the TFT.

Forming the electrochromic layer may include forming an electrochromic semiconductor layer in a region where the partition wall of the first substrate is not formed; and adding an electrochromic material to adsorb onto the electrochromic semiconductor layer. Forming the electrochromic semiconductor layer may include coating an electrochromic semiconductor on the region where the partition wall of the first substrate is not formed; and baking the coated electrochromic semiconductor, wherein a temperature for baking the coated electrochromic semiconductor is within a temperature range of about 200° C. to about 400° C.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout, and the thicknesses of layers and regions are exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
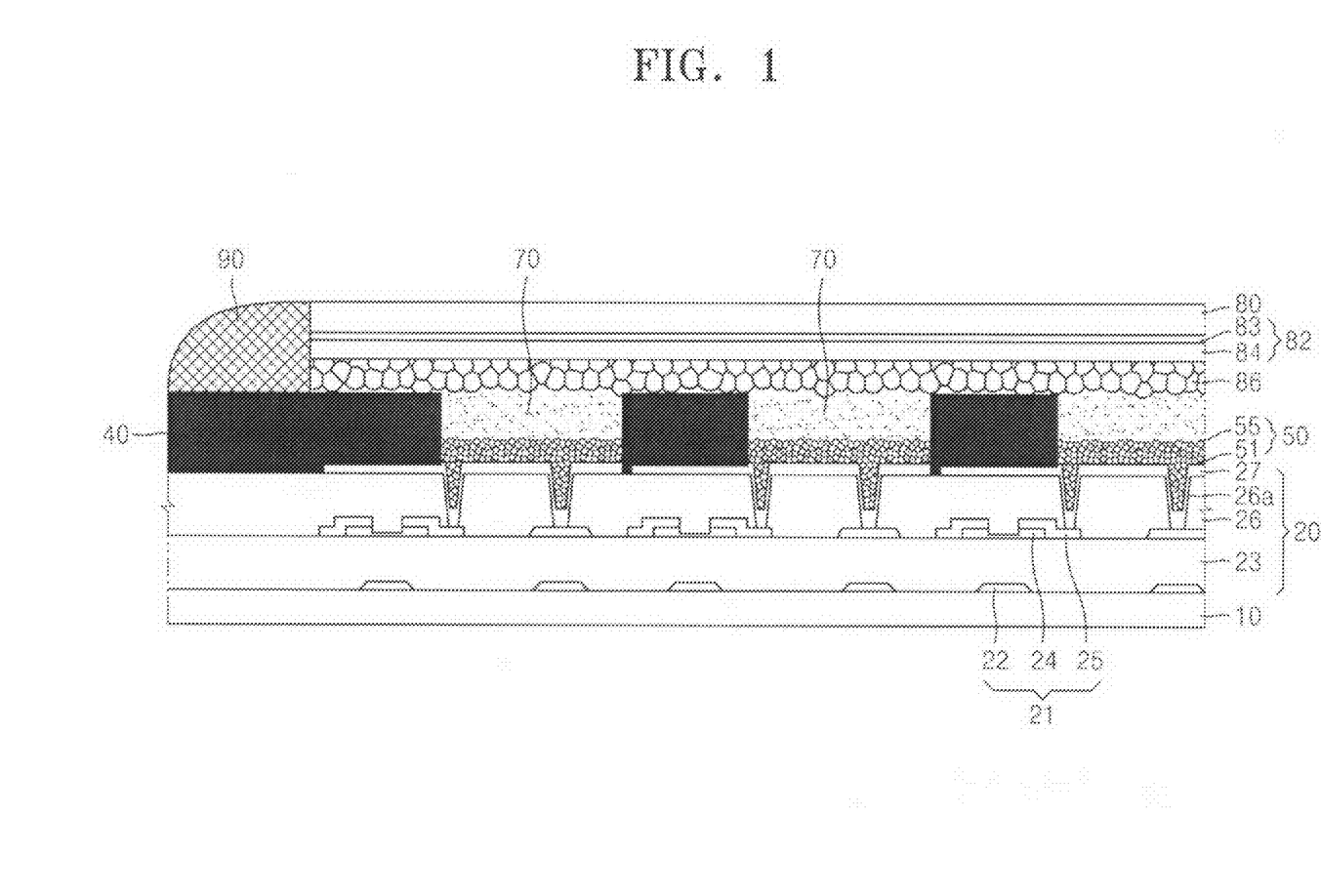
FIG. 1 is a diagram of a schematic configuration of an active matrix electrochromic device array according to example embodiments.

FIG. 1 is a diagram of a schematic configuration of an active matrix electrochromic device array according to example embodiments. Referring to FIG. 1, the active matrix electrochromic device array according to example embodiments may include a first substrate 10, a second substrate 80 separated from the first substrate 10, and an electrolyte 70 filling a space between the first substrate 10 and the second substrate 80.

The first substrate 10 may be formed of a transparent substrate. For example, the first substrate 10 may be formed of a glass transparent substrate or a flexible transparent plastic substrate using a polymer material including polyethylene terephthalate (PET), polyethylene naphthalate (PEN), polycarbonate, a polystyrene-based material, a polyacryl-based material and/or polyether sulfone (PES). The second substrate 80 may be formed of the same or different material as the first substrate 10. For example, the second substrate 80 may be formed of an opaque material. However, the first substrate 10 may be formed as an opaque substrate and the second substrate 80 may be formed as a transparent substrate. In example embodiments, a reflective layer 86 may be omitted.

A pixel circuit unit 20 is arranged on the first substrate 10. The pixel circuit unit 20 may be a structure of well-known active matrix circuit that independently drives each pixel. For example, the pixel circuit unit 20 may include a gate electrode 22 formed on the first substrate 10, an insulating layer 23 covering the gate electrode 22, a semiconductor layer 24, and source/drain electrodes 25 which are arranged on the insulating layer 23, a protective layer 26 covering the source/drain electrodes 25, and a pixel electrode 27 arranged on the protective layer 26. The gate electrode 22, the insulating layer 23, the semiconductor layer 24, and the source/drain electrodes 25 form a thin film transistor (TFT) 21. A capacitor electrode or a wiring circuit may further be arranged on a layer on which the gate electrode 22 is formed, or on a layer on which the source/drain electrodes 25 is formed. A contact hole 26a may be formed on the protective layer 26 so as to expose a portion of the source/drain electrodes 25, and the pixel electrode 27 may be electrically connected to the source/drain electrodes 25 via the contact hole 26a. The pixel circuit unit 20 has a structure in which the TFT 21 and the pixel electrode 27 form a pixel (refer to P of FIG. 2), and a plurality of the pixels are two-dimensionally arrayed. The number of the TFT 21 arranged in one pixel, or a wiring structure of the TFT 21 may vary according to a pixel circuit, and such a pixel circuit is not limited to example embodiments.

The pixel electrode 27 may be formed on the protective layer 26 for each of the unit pixels so that a voltage may be applied to each of the unit pixels. The pixel electrode 27 may be formed of a transparent conductive material, e.g., a transparent conductive polymer material including indium tin oxide (ITO), fluorine-doped tin oxide (FTO), $ZnO$—$Ga_2O_3$, $ZnO$—$Al_2O_3$, $SnO_2$—$Sb_2O_3$, and a polythiophene-based material. An electrochromic layer 50 may be formed on the pixel electrode 27. The electrochromic layer 50 may be an electrochromic semiconductor layer 51 that has adsorbed an electrochromic material 55.

The electrochromic layer 50 may be formed of at least one material selected from the group consisting of a titanium-based oxide, a zirconium-based oxide, a strontium-based oxide, a niobium-based oxide, a hafnium-based oxide, an indium-based oxide, a tin-based oxide, and a zinc-based oxide. The electrochromic material 55 may be adsorbed to a top surface of the electrochromic semiconductor layer 51. The electrochromic material 55, e.g., an n-type electrochromic material, may exhibit a discoloration effect by being adsorbed to a surface of the electrochromic semiconductor layer 51, by receiving moving electrons from the electrochromic semiconductor layer 51, and by generating a change of its molecular structure. Any material generally used in the electrochromic device field may be used in the electrochromic material 55 without restriction, and the material may include a viologen compound.

A counter electrode 82 formed of a conductive material may be arranged on a bottom surface of the second substrate 80, that is, a surface facing the first substrate 10, and the reflective layer 86 may be formed on a bottom surface of the counter electrode 82. The counter electrode 82 may be arranged to face the pixel electrode 27. Any conductive material may be used as the counter electrode 82, and the conductive material may further include an electroconductive material so as to increase a work function. For example, the counter electrode 82 may be formed as a double-layer including an ITO electrode layer 83 on the second substrate 80 and an Antimony-doped Tin Oxide (ATO) electrode layer 84 thereon. Also, if an insulation material includes a conductive material on its side facing a transparent electrode, the insulation material may be used as the counter electrode 82. In addition, an electrochemically stable material may be used in the counter electrode 82, and examples of the electrochemically stable material may include platinum, aurum, or carbon.

A redox material or a p-type electrochromic material, which is oxidized to maintain an electrically neutral state when the n-type electrochromic material 55 of the electrochromic layer 50 is deoxidized, may be adsorbed on the counter electrode 82. The p-type electrochromic material may be included in the electrolyte 70, or may exist in both the electrolyte 70 and the counter electrode 82. For example, the redox material or the p-type electrochromic material used in the counter electrode 82 may include Prussian blue, a Ferrocene compound derivative, or a phenothiazine compound derivative.

The reflective layer 86 may be formed on the ATO electrode layer 84. The reflective layer 86 may have a white color. A material forming the reflective layer 86 may include a metal oxide selected from the group consisting of a titanium oxide, a zirconium oxide, a strontium oxide, a niobium oxide, a hafnium oxide, an indium oxide, a tin oxide, a zinc oxide, and a mixture thereof but is not limited thereto. A particle size of the metal oxide used to form the reflective layer 86 may be from about 100 to about 500 nm. For example, the reflective layer 86 may be formed of the same metal oxide as that of the electrochromic layer 50, except for having an enlarged particle size.

A partition wall 40 may be formed on the protective layer 26 and the pixel electrode 27, so as to form a space for impregnating the electrolyte 70 at a position corresponding to the electrochromic layer 50, and simultaneously to support the first substrate 10 and the second substrate 80 by having a distance between the first substrate 10 and the second substrate 80. The partition wall 40 may be formed by using a photoresist, e.g., SU-8, to be described later in a manufacturing process. The partition wall 40 may be formed to have a non-porous characteristic by removing bubbles when the photoresist is coated. A sealing member 90 will be described in further detail below.

Figure 2:
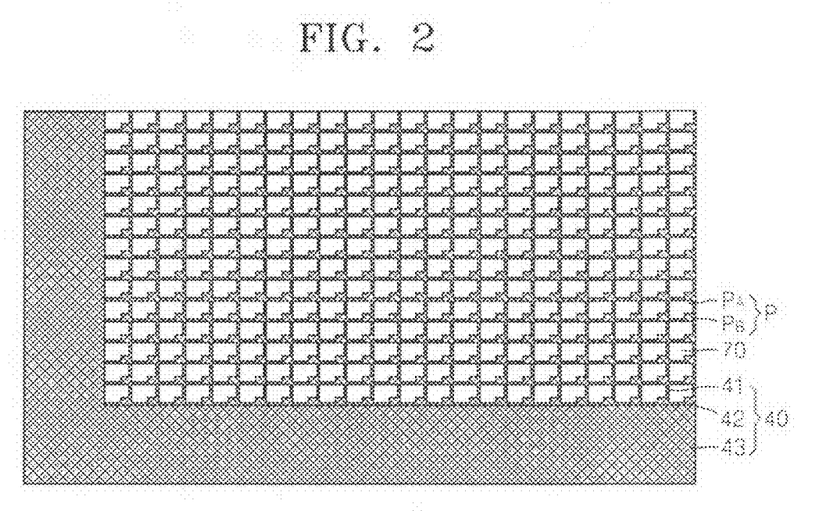
FIG. 2 is a top view of the active matrix electrochromic device array of FIG. 1, illustrating a top surface pattern of a partition wall structure.

FIG. 2 is a top view of the active matrix electrochromic device array of FIG. 1, illustrating a top surface pattern of a partition wall structure. Referring to FIG. 2, a pixel P may be formed of a first region $P_A$ including the TFT 21 (refer to FIG. 1), and a second region $P_B$ in which the pixel electrode 27 is connected to the source/drain electrodes 25 of the TFT 21. The partition wall 40 may be formed of a photoresist in such a manner that a final resultant exhibits a black color. The partition wall 40 may include a pixel-partitioning wall 41 isolating each of the pixels P, and a supporting partition wall 42 positioned in the first region $P_A$, which is an upper region of the TFT 21. Furthermore, the partition wall 40 may include an outer partition wall 43 that is formed in an outer region by extending from an array of the pixels P.

The pixel-partitioning wall 41 may prevent or reduce cross-talk by sealing the electrolyte 70 for each pixel P, and may increase a contrast ratio to the white reflective layer 86 by performing a black matrix which defines the pixels P. The partition wall 40 may be formed to have a height sufficient to isolate the electrolyte 70. For example, the partition wall 40 may have a height equal to or greater than about 50 μm. The electrolyte 70 may be filled in second region $P_B$. By forming the partition wall 40 having the sufficient height, a sufficient amount of the electrolyte 70 may be impregnated in each pixel P, so that an electrochromic reaction may be further actively performed, and an electrochromic response speed may be improved.

Also, because the supporting partition wall 42 is formed in the first region $P_A$, the partition wall 40 may not collapse although the partition wall 40 has a considerable height, and a rigidity of the partition wall 40 may be supplemented to support the first substrate 10 and the second substrate 80 by having the distance between the first substrate 10 and the second substrate 80. As illustrated in FIG. 1, the outer partition wall 43 that extends toward an outer area of a region covered by the second substrate 80 may be covered by a sealing member 90 so as to completely seal the electrolyte 70.

In an active matrix electrochromic device array according to the related art, a partition wall for separating pixels does not sufficiently isolate an electrolyte, or an image may be diffused due to a porous characteristic of the partition wall. In the active matrix electrochromic device array according to example embodiments, the space in which the electrolyte 70 is impregnated may be actually partitioned for each pixel P by the partition wall 40. Also, when the partition wall 40 is formed of the photoresist, the bubbles may be removed so that a phenomenon in which the electrolyte 70 is permeated into the partition wall 40 and diffused may be avoided. Thus, the active matrix electrochromic device array according to example embodiments may solve an image diffusion problem caused when the electrolyte 70 moves to a neighboring pixel P.

The electrolyte 70 may be filled in the space formed by the first substrate 10, the second substrate 80, and the partition wall 40. The electrolyte 70 may include a liquid type, a molten salt type, and a solid type electrolyte. In more detail, the electrolyte 70 may be an electrolyte obtained by dissolving one or two types of electrolytes formed of a material.

The material may be selected from the group consisting of a solvent including propylene carbonate, ethylene carbonate, diethyl carbonate, ethyl methyl carbonate, ethyl propyl carbonate, butylenes carbonate, benzonitrile, acetonitrile, tetrahydrofuran, 2-methyl tetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, dimethyl carbonate, methyl ethyl carbonate, diethyl carbonate, methyl propyl carbonate, methylisopropylcarbonate, ethylpropylcarbonate, dipropylcarbonate, dibutylcarbonate, diethyleneglycol, and dimethylether, an imidazolium-based molten salt including trialkylimidazolium, and any mixtures thereof, and a lithium salt selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(CxF_{2x+1}SO_2)(CyF_{2y+1}SO_2)$(where, x and y are natural numbers), LiCl, and LiI.

An inactive salt, e.g., lithium salt, may be dissolved in the electrolyte with a density of about 0.01 to about 1.0 M, for example, of about 0.05 to about 0.2 M. Also, as the redox material, a ferrocene-based compound or a phenothiazine-based compound may be dissolved in the electrolyte with density of about 0.01 to about 0.2 M.

Figure 3A:
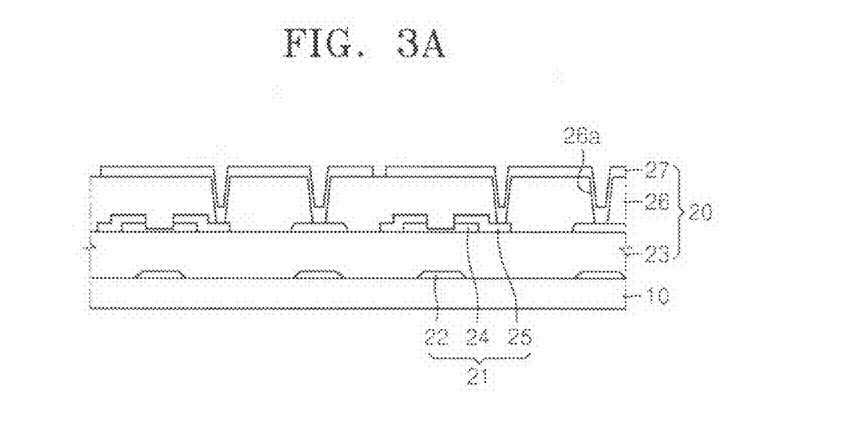
FIGS. 3A through 3F are diagrams for describing a method of manufacturing an active matrix electrochromic device array, according to example embodiments.

A method of manufacturing an active matrix electrochromic device array will be described with reference to FIGS. 3A through 3F. Referring to FIG. 3A, the pixel circuit unit 20 may be formed on the first substrate 10. For example, a metal layer may be formed on a front surface of the first substrate 10, and the metal layer may be selectively patterned by using a photoresist process and an etching process so as to form the gate electrode 22, and the insulating layer 23 may be formed on the front surface of the first substrate 10 including the gate electrode 22 by using an insulating material including SiOx or SiNx.

A semiconductor material including an intrinsic amorphous silicon may be deposited on the insulating layer 23, selectively patterned by using a photoresist process and an etching process, and a doping process may be performed so that the semiconductor layer 24 and the source/drain electrodes 25 may be formed on the insulating layer 23 on the gate electrode 22. A channel region of the semiconductor layer 24 may be exposed. An organic insulation material including benzocyclobutene (BCB) or photo-acryl may be coated on the front surface of the first substrate 10 including the source/drain electrodes 25.

The contact hole 26a may be formed by performing a photoresist process and an etching process on the protective layer 26 so that the source/drain electrodes 25 is partly exposed. A transparent conductive layer may be formed on the front surface of the first substrate 10, and may be patterned by using a photoresist process and an etching process, so that the pixel electrode 27 may be formed for each of the pixels. The pixel electrode 27 may be connected to a side of the source/drain electrodes 25 of the TFT 21 via the contact hole 26a. An electrode of a capacitor configuring a wiring circuit (not shown) or a pixel circuit, which is connected to the TFT 21 and the pixel electrode 27, may be formed at the same time when the gate electrode 22 and the source/drain electrodes 25 are formed.

Figure 3B:
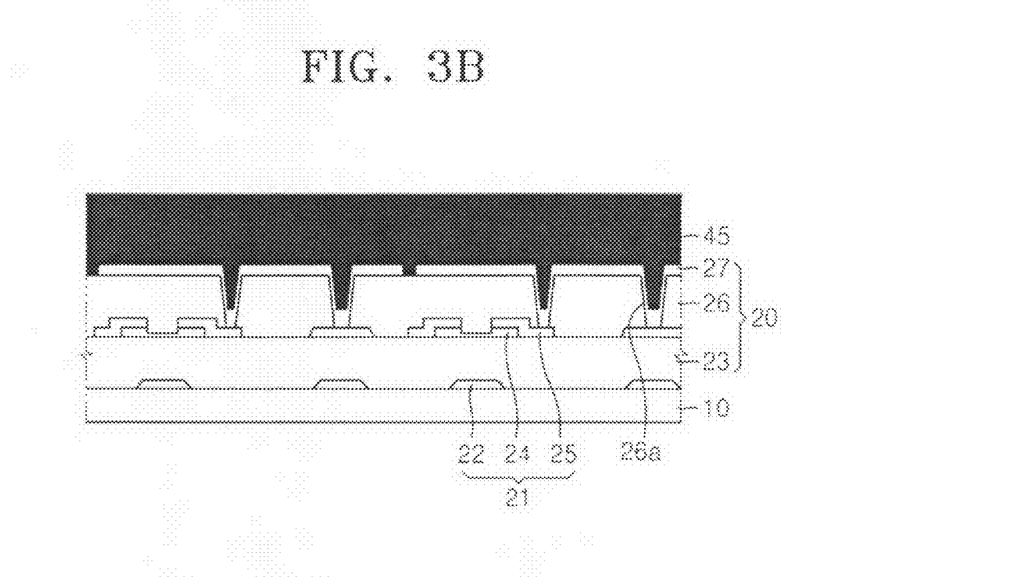

As illustrated in FIG. 3B, a photoresist may be coated on the first substrate 10 having the pixel circuit unit 20 formed thereon, so that a photoresist layer 45 may be formed. The photoresist may include SU-8. The photoresist layer 45 may be formed to have a height of about 50 μm. The photoresist layer 45 may be formed by spin-coating the photoresist for about 5 through about 30 seconds at about 1000 rpm through about 3000 rpm. The photoresist may be coated after removing microbubbles so as not to form bubbles when the photoresist layer 45 is formed. A soft baking operation may be performed on the photoresist layer 45 for about 5 through about 15 minutes at a temperature of 95° C. An exposure may be performed on a top surface of the photoresist layer 45 for about 5 through about 50 seconds by using a mask having a partition wall pattern formed thereon, wherein the top surface has undergone the soft baking operation. In a first operation, a post exposure baking operation may be performed for about 1 minute at a temperature of 65° C., and in a second operation, the post exposure baking operation may be performed for about 5 minutes at a temperature of 95° C.

Figure 3C:
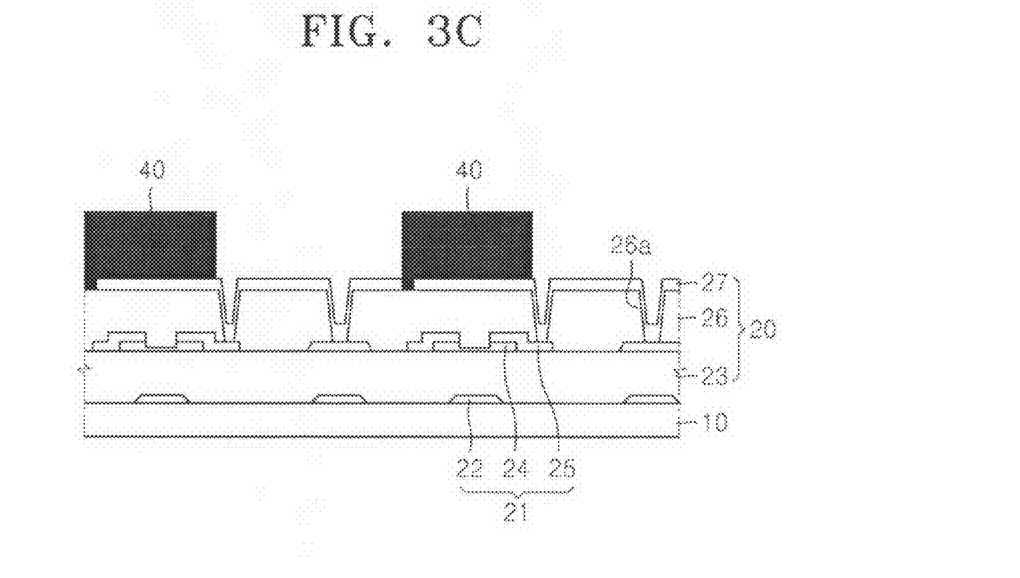

If the partition wall pattern is not formed properly on the photoresist layer 45 in the first operation, the first operation may be repeated. Referring to FIG. 3C, the photoresist except for the partition wall 40 may be removed by performing a development operation on the photoresist layer 45 for about 5 minutes through about 1 hour, wherein the photoresist layer 45 has undergone the post exposure baking operation, so that the pixel electrode 27 may be exposed. The first substrate 10 may be immersed in isopropyl alcohol (IPA) so as to remove a residual, and may be cleaned by using acetone and dried for about 5 seconds through 1 minute.

A hard baking operation may be performed on the first substrate 10 having the cleaned and dried partition wall 40 formed thereon for about 30 minutes at a temperature of 150° C. and for about 30 minutes at a temperature of 200° C. After the hard baking operation, the partition wall 40 may be hardened at a temperature of about 250° C. through about 350° C. When SU-8 is used as the photoresist, the photoresist may be changed from a transparent state to a black state via the hardening process.

Figure 3D:
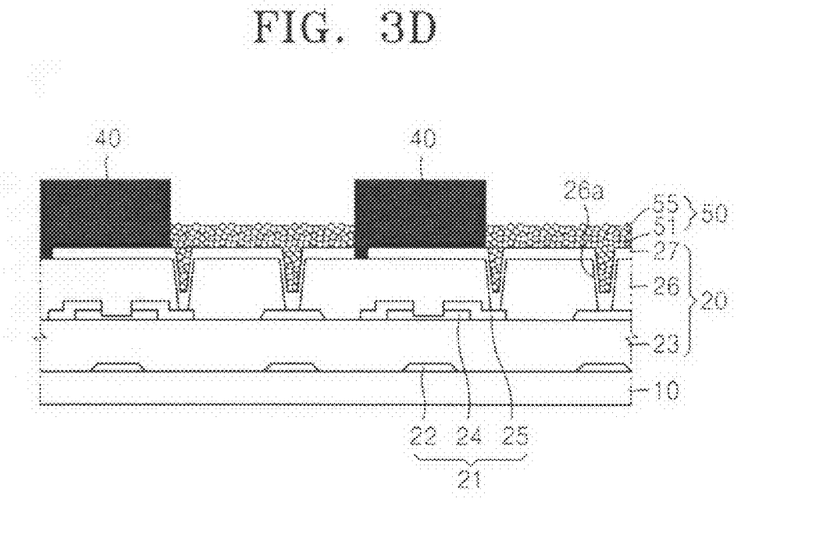

As illustrated in FIG. 3D, the electrochromic layer 50 may be formed on the pixel electrode 27. The electrochromic layer 50 may be formed in a manner where titanium dioxide ($TiO_2$) is deposited on the pixel electrode 27 and baked so that the electrochromic semiconductor layer 51 may be formed. The electrochromic material 55 may be adsorbed on the electrochromic semiconductor layer 51. A baking temperature applied to the electrochromic semiconductor layer 51 may be within a temperature range that is less than a threshold temperature at which a semiconductor characteristic of the TFT 21 is invalid and that may maintain a shape of the partition wall 40. For example, a baking operation may be performed at a temperature in the range of about 200° C. to about 400° C., more particularly, in a range of about 250° C. to about 350° C.

Figure 3E:
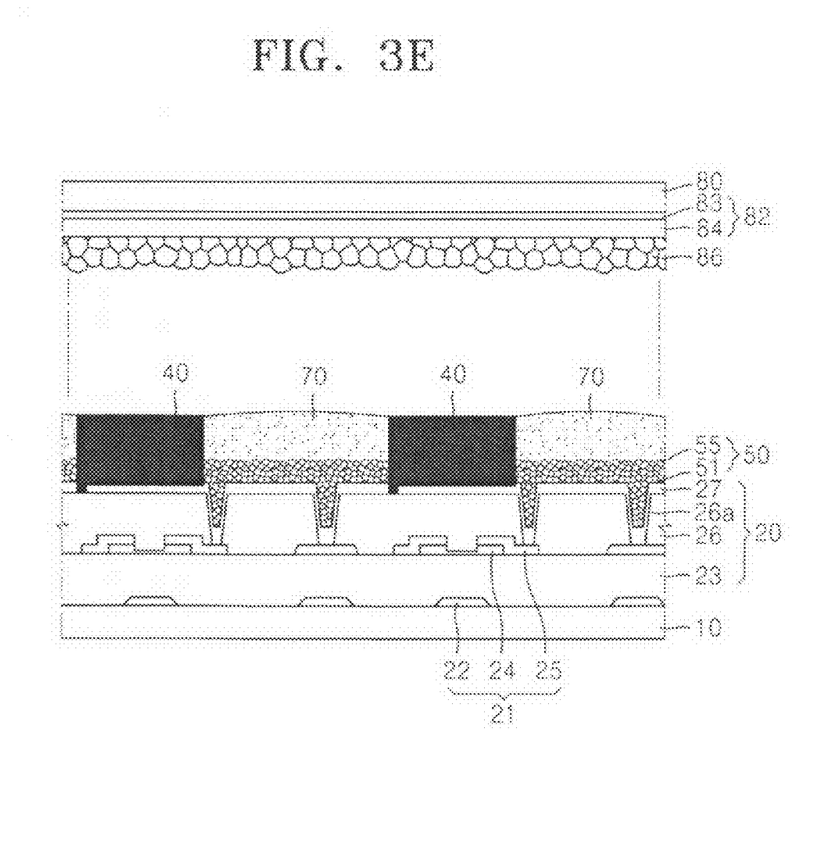

As illustrated in FIG. 3E, the second substrate 80 may be arranged, and the counter electrode 82 and the reflective layer 86 may be formed on a surface of the second substrate 80. For example, the ITO electrode layer 83 and the ATO electrode layer 84 may be sequentially deposited on the second substrate 80 so that the counter electrode 82 may be formed, and a titanium oxide may be deposited on the counter electrode 82 so that the reflective layer 86 may be formed.

Figure 3F:
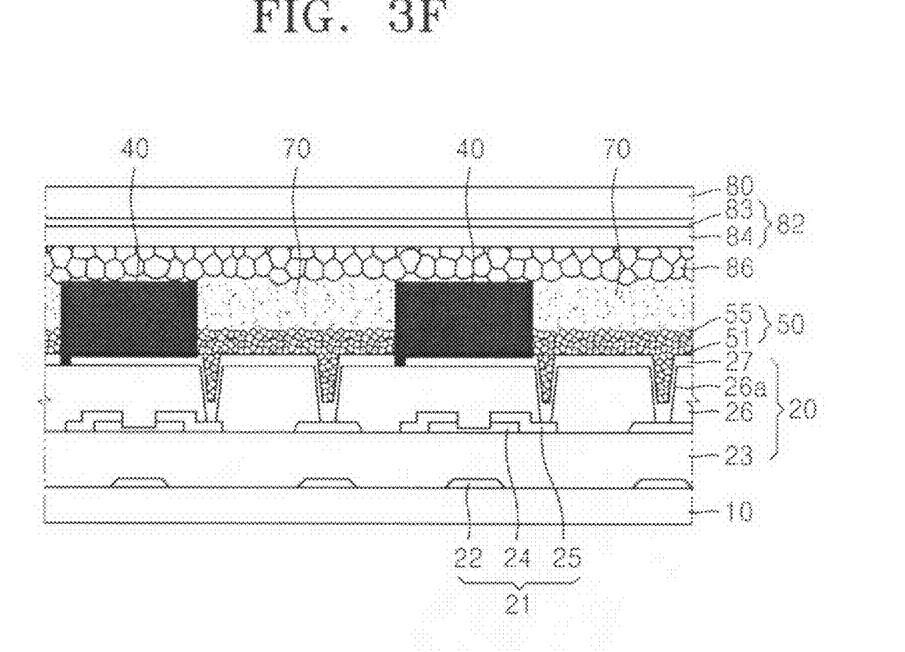

The first substrate 10 and the second substrate 80 may be aligned in such a manner that the pixel electrode 27 of the first substrate 10 and the counter electrode 82 of the second substrate 80 face each other, and the electrolyte 70 may be inserted between the first substrate 10 and the second substrate 80. As illustrated in FIG. 3F, the active matrix electrochromic device array is complete by sealing the first substrate 10 and the second substrate 80.

Figure 4:
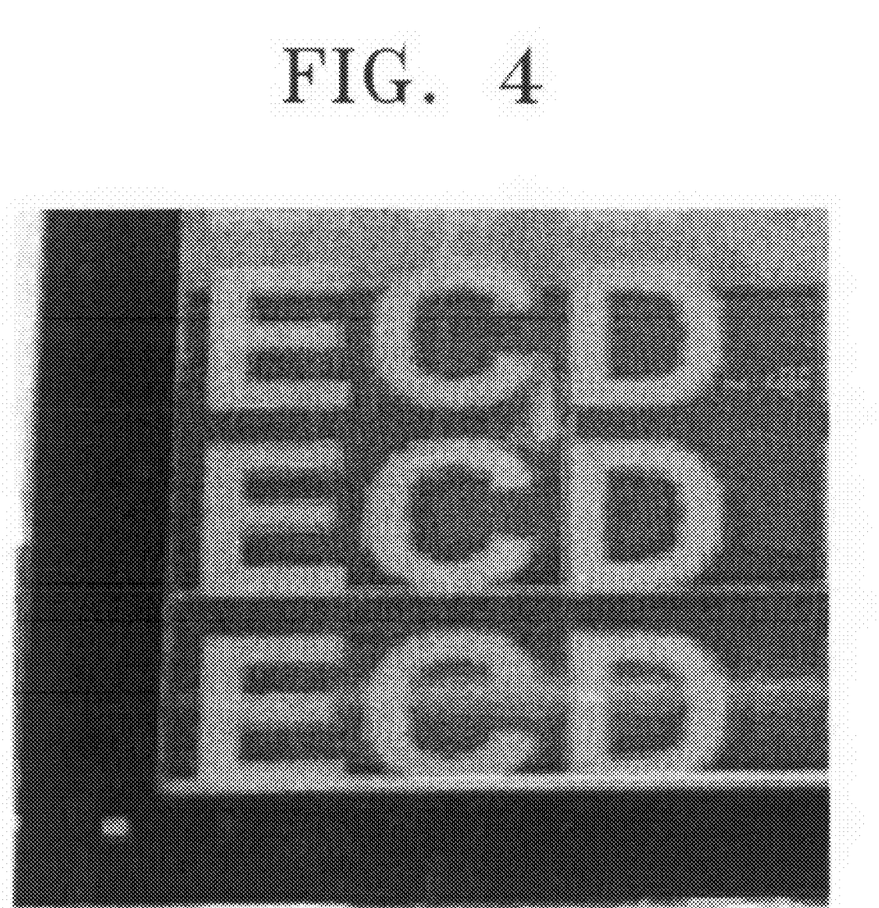
FIG. 4 is a picture for showing an operation of the active matrix electrochromic device array manufactured according to the manufacturing method of FIGS. 3A through 3F.

FIG. 4 is a photo illustrating an operation of the active matrix electrochromic device array manufactured according to the manufacturing method described above. As illustrated in FIG. 4, an image may be clearly realized without crosstalk.

The active matrix electrochromic device array and the method of manufacturing the same according to example embodiments have the following effects. The electrolyte may be isolated by the partition wall structure by using the photoresist, so that an image diffusion problem of an active matrix electrochromic device array according to the related art may be solved. The partition wall structure may perform a function of a black matrix by using the photoresist, so that a contrast ratio may be increased. When the electrochromic material is baked at a high temperature, the partition wall may be stably formed at a temperature that does not highly affect the TFT of the pixel circuit unit. The partition wall having a height sufficient to isolate a sufficient amount of the electrolyte in each of the pixels may be formed in such a manner that the electrochromic response speed may be improved.

It should be understood that example embodiments described therein should be considered in a descriptive sense only and not for purposes of limitation. Descriptions of features or aspects within each example embodiment should typically be considered as available for other similar features or aspects in other example embodiments.

What is claimed is:

1. An active matrix electrochromic device array comprising:
   a first substrate including a pixel circuit having a plurality of pixel electrodes, wherein the plurality of pixel electrodes are two-dimensionally arrayed, a thin film transistor (TFT) connected to each of the plurality of pixel electrodes, and a plurality of electrochromic layers on the plurality of pixel electrodes, respectively;
   a second substrate including a counter electrode and a reflective layer thereon, wherein the second substrate is coupled to the first substrate having a distance therebetween and the reflective layer faces the plurality of electrochromic layers;
   a partition wall between the first substrate and the second substrate so as to support the first substrate and the second substrate having a distance therebetween, the first and second substrate having isolating spaces therebetween corresponding to the plurality of pixel electrodes; and
   an electrolyte filled in the spaces isolated by the first substrate, the second substrate, and the partition wall.

2. The active matrix electrochromic device array of claim 1, wherein the partition wall further comprises a supporting partition wall arranged in an upper region of the TFT.

3. The active matrix electrochromic device array of claim 1, wherein the partition wall is formed of a photoresist.

4. The active matrix electrochromic device array of claim 3, wherein the partition wall is a black matrix with respect to pixels.

5. The active matrix electrochromic device array of claim 3, wherein the partition wall is non-porous.

6. The active matrix electrochromic device array of claim 1, wherein the partition wall is formed to have a height of about 50 μm.

7. The active matrix electrochromic device array of claim 1, wherein the partition wall is a black matrix defining pixels.

8. The active matrix electrochromic device array of claim 1, wherein the partition wall is non-porous.

9. The active matrix electrochromic device array of claim 1, wherein the partition wall is formed by extending toward an outer region of an area including the plurality of pixel electrodes.

10. A method of manufacturing an active matrix electrochromic device array, the method comprising:
    providing a first substrate including a pixel circuit having a plurality of pixel electrodes that are two-dimensionally arrayed and a thin film transistor (TFT) connected to each of the plurality of pixel electrodes;
    forming a partition wall in the first substrate, wherein the partition wall isolates a space corresponding to the plurality of pixel electrodes;
    forming an electrochromic layer in a region of the first substrate, wherein the partition wall is not formed in the region;
    arranging a second substrate over the first substrate, the second substrate including a counter electrode and a reflective layer on the counter electrode;
    aligning the first substrate and the second substrate so that the reflective layer faces the electrochromic layer;
    injecting an electrolyte into the space isolated by the first substrate, the second substrate, and the partition wall; and
    coupling the first substrate and the second substrate.

11. The method of claim 10, wherein forming the partition wall comprises:
    coating a photoresist on the first substrate;
    removing the photoresist coated on regions corresponding to the plurality of pixel electrodes; and
    hardening the photoresist remaining on the first substrate.

12. The method of claim 11, wherein coating the photoresist further comprises removing bubbles of the photoresist before the first substrate is coated.

13. The method of claim 11, wherein a region where the partition wall is formed includes an upper region of the TFT.

14. The method of claim 11, wherein the partition wall is formed to have a height of at least 50 μm.

15. The method of claim 10, wherein the partition wall is formed by extending toward an outer region of an area where the plurality of pixel electrodes are arranged.

16. The method of claim 10, wherein a region where the partition wall is formed includes an upper region of the TFT.

17. The method of claim 10, wherein forming the electrochromic layer comprises:
    forming an electrochromic semiconductor layer in a region where the partition wall of the first substrate is not formed; and
    adding an electrochromic material to adsorb onto the electrochromic semiconductor layer.

18. The method of claim 17, wherein forming the electrochromic semiconductor layer comprises:
    coating an electrochromic semiconductor on the region where the partition wall of the first substrate is not formed; and
    baking the coated electrochromic semiconductor,
    wherein a temperature for baking the coated electrochromic semiconductor is within a temperature range of about 200° C. to about 400° C.

* * * * *